Figure 1:
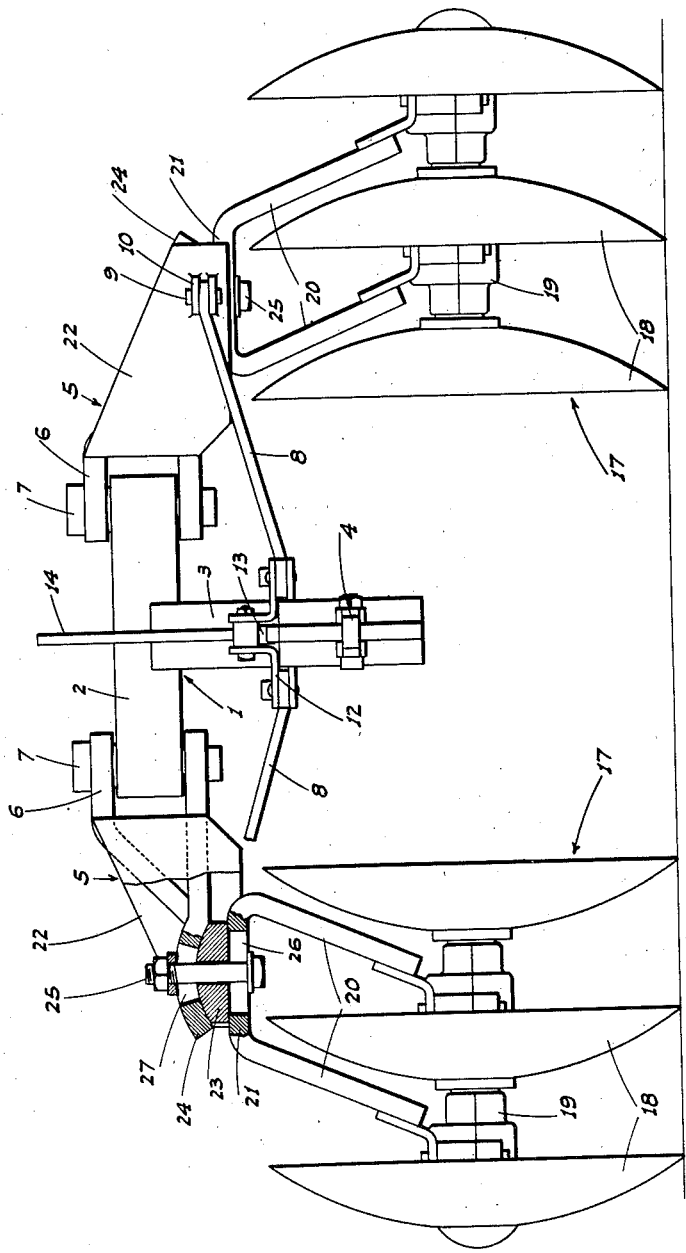

June 17, 1952     S. S. MOORE     2,601,165
DISK HARROW

Filed Aug. 4, 1945     2 SHEETS—SHEET 1

INVENTOR.
Stanley S. Moore
BY
ATTYS

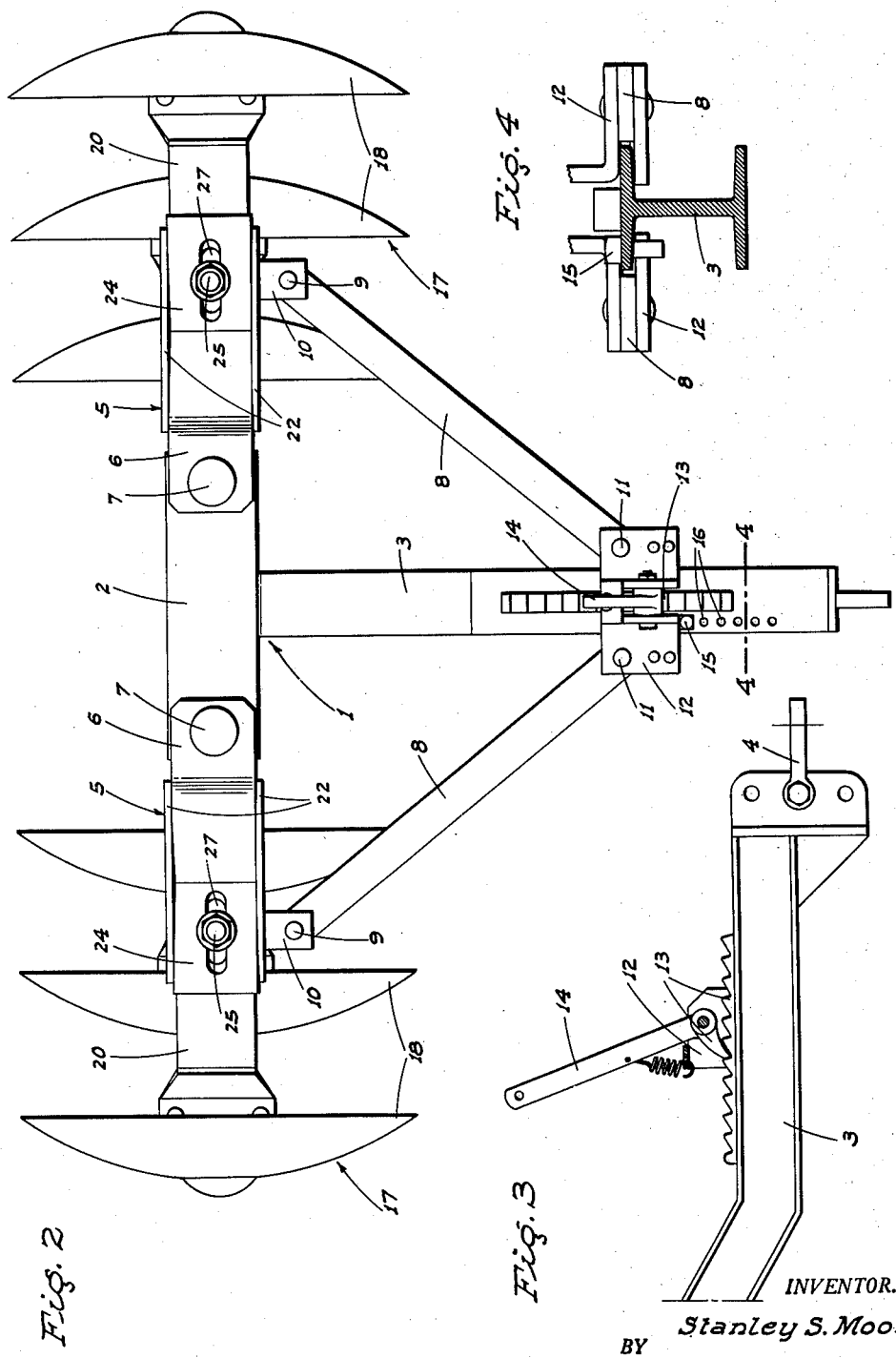

Patented June 17, 1952

2,601,165

UNITED STATES PATENT OFFICE 2,601,165

DISK HARROW

Stanley S. Moore, Stockton, Calif.

Application August 4, 1945, Serial No. 608,929

2 Claims. (Cl. 55—81)

This invention is directed in general to an agricultural implement, and in particular relates to, and it is an object to provide, an improved disc harrow.

Another object of the invention is to provide a disc harrow, especially designed for ridging in orchards or the like; such implement including a pair of transversely spaced disc gangs of relatively short length, and said disc gangs being mounted in novel manner for adjustment of the working angle of the discs relative to the line of draft, the working angle of the discs relative to perpendicular, and the spacing between the disc gangs.

A further object of the invention is to provide a disc harrow, of the type described, in which the separate gangs are each reversibly mounted by standards which diverge relative to perpendicular whereby when said standards are set with laterally outward divergence, the disc gangs are spaced apart for forming ridges, while in reversed position of said standards the disc gangs are close to each other for cutting down ridges.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a front elevation of the implement.
Figure 2 is a plan view of the implement.
Figure 3 is a fragmentary side elevation of the draft tongue and associated holding pawl and ratchet unit.
Figure 4 is a cross section on line 4—4 of Fig. 2.

Referring now more particularly to the characters of reference on the drawings, the implement comprises a rigid draft frame, indicated generally at 1, and which includes a relatively short, heavy cross beam 2, from the center of which a rigid draft tongue 3 projects forwardly; said tongue being in the form of an I-beam. At its forward end the tongue is provided with a vertically adjustable hitch 4 adapted for connection to the drawbar of a tractor.

At opposite ends the cross beam 2 is provided with laterally extending brackets 5, each of which includes a vertical axis clevis 6 straddling the adjacent end of said cross beam and pivotally secured to the latter, for swinging movement in a horizontal plane, by a vertical pin 7. The angles of the brackets 5 are adjustably maintained the same by means of links 8 pivoted at their rear ends, as at 9, to ears 10 which project forwardly from said brackets. From the pivots 9 the links 8 extend forwardly in converging relation and are pivoted, as at 11, on opposite sides of a slide carriage 12 mounted on the top flange of the I-beam draft tongue 3 in the manner clearly shown in Fig. 4. The slide carriage 12 is adjustably positioned along the tongue 3 by a holding pawl and ratchet unit, indicated generally at 13, and which unit includes a spring returned release lever 14. The holding pawl and ratchet unit 13 is operative to normally maintain the slide carriage 12 against retraction and the brackets 5, in any adjusted position, against rearward swinging movement. Further, advance of the slide carriage 12 from any given position of adjustment is prevented by means of a headed stop pin 15 adapted to be engaged selectively in any one of a longitudinal row of holes 16 in the top flange of the tongue 3 along one side of the latter.

Below each of the laterally extending brackets 5 the implement includes a relatively short disc gang, indicated generally at 17, and each of which gangs comprises discs 18 carried on an axle assembly 19. The gangs 17 are each mounted on the implement by means of an inverted, generally U-shaped standard 20 whose spaced-apart parallel legs diverge downwardly relative to perpendicular.

The top plate 21 of each standard is disposed between a pair of transversely extending, spaced, dependent flanges 22 on the corresponding bracket 5, which flanges thus form a guideway or guide channel for said top plate.

A spacing and adjustment block 23 is disposed between the top plate 21 and the outer end of the bracket 5; said adjustment block 23 being formed with a transverse arcuate top face, and said outer end of the bracket being formed as a matching saddle 24. A tie bolt 25 extends through the top plate 21, block 23, and saddle 24, normally securing the same in rigid relation. However, the top plate 21, together with the saddle 24, are transversely slotted, as at 26 and 27, respectively. By reason of this slotting arrangement the corresponding disc gang 17 may be adjusted as follows:

To adjust the spacing of the disc gangs laterally of the implement, the bolts 25 are loosened and the top plates 21 slid along between the depending sets of flanges 22; the bolts 25 being tightened when the proper position of adjustment is reached. To adjust the working angle of the discs 18 relative to perpendicular the bolts 25 are loosened and the disc gangs 17 rocked, in a vertical plane transversely of the implement, to desired position, and thereafter the bolts are tightened. Such rocking to position is of course possible by reason of the complementary arcuate faces on the adjustment block 23 and sadddle 24, together with the provision of the slot 27.

When the standards 20 are disposed with the legs thereof in laterally outwardly diverging relation to perpendicular, the disc gangs 17 are spaced apart for ridge forming. However, under certain working conditions, as when it is desired to cut down a ridge, the top plates 21 of the standards 20 are reversed in their position between the corresponding flanges 22, and so that the legs of said standards then diverge downwardly and laterally inwardly relative to perpendicular, whereby the gangs 17 are then disposed in closely adjacent relation under the cross beam 2.

The working angle of the disc gangs 17 reltive to the line of draft is adjusted through the medium of the holding pawl and ratchet unit 13 which controls the position of the slide carriage 12, and which carriage in turn, and by means of the links 8, regulates swinging of the brackets 5 about pivots 7 and said working angle of the disc gangs. The holding pawl and ratchet unit 13 is controlled by the operator from his seat on the tractor by means of a cord (not shown) connected to the upper end of the spring-returned release lever 14.

By reason of the described structure the implement is quite simple and yet rugged, capable of withstanding heavy-duty use. In addition, the means provided for various adjustments of the disc gangs 17 makes the implement very practical and efficient, and an implement which is adaptable to many working conditions.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A disc harrow comprising a rigid draft tongue, a rigid relatively short cross beam fixed at right angles to the trailing end of the tongue, a bracket pivoted to each outer end of the cross beam for horizontal swinging movement, each bracket projecting outwardly beyond the corresponding outer end of the cross beam, a pair of relatively short disc gangs, an upstanding supporting standard on each gang, each standard comprising a top plate and a supporting leg projecting downwardly from the top plate at an angle divergent from perpendicular, the major portion of the gang being supported on the leg in a position laterally out from the central vertical axis of the top plate, the top plate of each standard being detachably supported on the bottom of one of the brackets whereby the standards may be turned so that the diverging leg of each bracket may be projected either outwardly or inwardly of the said bracket, to either position the gangs in relatively widely spaced apart relation or to position them in relatively closely adjacent relation under the cross beam, respectively, and means for swinging the brackets on their pivots to adjust the working angle of the gangs.

2. A disc harrow comprising a rigid draft tongue, a rigid relatively short cross beam fixed at right angles to the trailing end of the tongue, a bracket pivoted to each end of the cross beam for horizontal swinging movement, each such bracket projecting outwardly beyond the adjacent outer end of the cross beam, each bracket having spaced apart dependent flanges on its under side forming a channel, a pair of relatively short disc gangs, an upstanding supporting standard on each gang, each standard comprising a top plate and a pair of substantially parallel spaced apart legs projecting downwardly from the top plate at an angle divergent from perpendicular, the major portion of each gang being supported on the corresponding legs in a position laterally out from the central vertical axis of the top plate, the top plate of each standard being detachably supported in the channel of one of the brackets whereby the standard may be turned so that the diverging legs thereon may project outwardly or inwardly of the bracket, respectively, to position the gangs in relatively widely spaced apart relation or to position them in relatively closely adjacent relation under the cross beam, and means for swinging the brackets on their pivots to adjust the working angle of the gangs.

STANLEY S. MOORE.

REFERENCES CITED

The following references are of record in the file of this patent:

UNITED STATES PATENTS

| Number | Name | Date |
| --- | --- | --- |
| 309,345 | Grayson | Dec. 16, 1884 |
| 313,654 | Chandler | Mar. 10, 1885 |
| 530,932 | Dodson | Dec. 18, 1894 |
| 590,191 | Holsclaw | Sept. 14, 1891 |
| 845,902 | Sharp | Mar. 5, 1907 |
| 930,252 | Waterman | Aug. 3, 1909 |
| 931,928 | Hulce | Aug. 24, 1909 |
| 1,941,504 | White | Jan. 2, 1934 |
| 2,338,698 | White | Jan. 11, 1944 |
| 2,345,803 | Gemberling | Apr. 4, 1944 |